Figure 1:
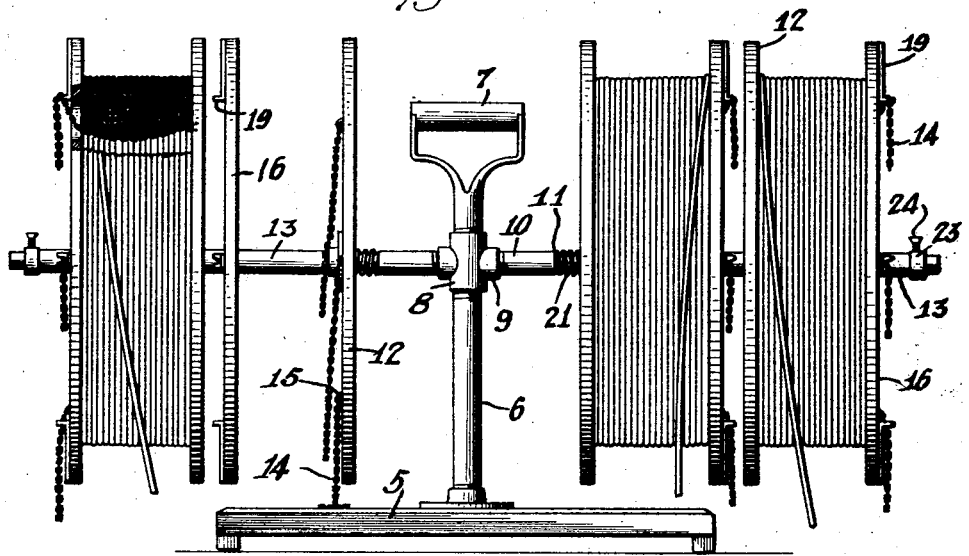

Oct. 20, 1925.

H. E. SHEELEY

ADJUSTABLE REEL

Filed Nov. 28, 1924

Inventor:
Howard Elmer Sheeley

Patented Oct. 20, 1925.

1,557,887

UNITED STATES PATENT OFFICE.

HOWARD E. SHEELEY, OF MICHIGAN CITY, INDIANA.

ADJUSTABLE REEL.

Application filed November 28, 1924. Serial No. 752,819.

*To all whom it may concern:*

Be it known that I, HOWARD E. SHEELEY, a citizen of the United States, residing at Michigan City, in the county of La Porte and State of Indiana, have invented a new and useful Adjustable Reel, of which the following is a specification.

My invention relates to an adjustable reel for use in the unwinding of electric wire or any other flexible material, electric wires of numerous sizes for use in the commercial lighting industry are manufactured in 500 foot coils, also nearly every manufacturer of wire, produces coils of different diameter, hence my idea of the need of an adjustable reel.

The present invention relates to an adjustable reel and has for its principal object to provide a device of this nature which is particularly useful in the winding and unwinding of electric wire or any other flexible material so that the same may be conveniently handled. It is the common practice to manufacture electric wires of numerous sizes for use in the commercial lighting industry in five hundred foot coils and because of the different diameters of the wire the adjustable reel is necessary.

Another very important object of the invention is to provide a reel structure embodying a plurality of reels which may be easily and quickly assembled or disassembled, said structure being capable of easy transportation.

With the above and numerous other objects in view as will appear as the description proceeds, the invention resides in certain novel details of construction as will be hereinafter more fully described and claimed.

Figure 2:
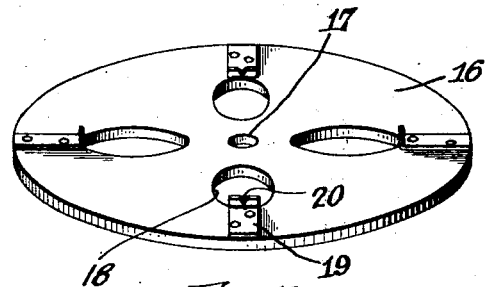
Figure 3:
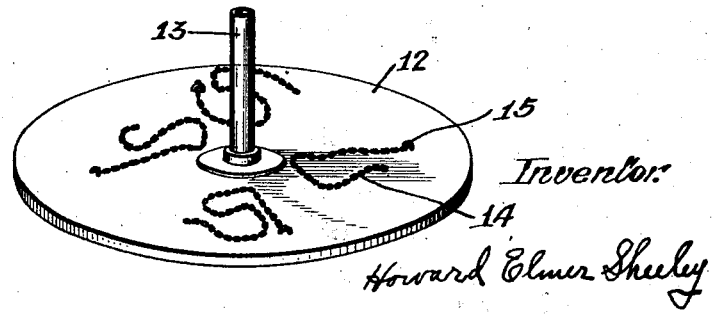

In the drawing:

Figure 1 is an elevation of the reel structure embodying the features of my invention, Figure 2 is a perspective view of one disc of one of the reels, Figure 3 is a perspective view of the other disc of the reel and its tubular drum member.

Referring to the drawing in detail it will be seen that 5 designates a base having a centrally located standard rising therefrom and terminating at its upper end in a handle 7. The standard 6 is preferably constructed in two sections held together by a coupling 8 having transversely extending branches 9 for receiving spindle arms 10 which are reduced as at 11. One or more reels are adapted to be received on each spindle arm 10, that is on the reduced portion thereof. As these reels are identical in construction only one will be described in detail.

Referring now particularly to the reel per se and Figures 2 and 3 of the drawing it will be seen that 12 designates a disc fixed to a tubular drum 13 which extends coaxially therefrom. A plurality of chains or other flexible members 14 are fixed at their ends by means of staples 15 or similar fastening elements to the inner face of the disc 12 in a circular arrangement concentrically about the axis of the disc. A second disc 16 is provided with a central aperture 17 for receiving the tubular drum 13 and with a plurality of openings 18 arranged at regular spaced intervals concentrically about the aperture 17. A plurality of L-shaped members 19 are fixed to the outer side of the disc 16. There is provided one member 19 adjacent the outer end of each opening 18. One side of this member is fixed to the disc while the other side, which is the shorter side, extends transversely therefrom and has its extremity notched as indicated at 20.

In assembling the reel structure the spindle arms have placed thereon coil springs 21 adjacent the shoulders 11. The disc 12 and tubular drum 13 is then inserted over the reduced portion of the arm, the disc 16 is then assembled on the drum 13. A collar 23 is inserted over the spindle arm and is locked in place by a set screw 24 to prevent the disassembly of the reel. Of course, if a plurality of reels are to be used they will be assembled in practically the same manner, it being understood, of course, that the collar 23 is always the last to go on the spindle arm. The springs 21 tend to prevent accidental rotation of the reels and also assist the collar 23 in holding the reels properly assembled.

After the wire or other flexible material has been wound upon the reel in a manner which will be self evident, the chains 14 may be stretched across the reel to extend through the openings 18 and engaged in the notches 20 as is indicated in Figure 1, particularly in the upper left hand corner thereof, and thus the wire will be prevented from unwinding during transportation.

What I claim as new is:

A reel structure of the class described including a base, a standard rising from the base, and terminating at its upper end in a handle, a pair of spindle arms radiating in opposite directions from an intermediate portion of the standard and being reduced at their outer portions so as to form shoulders, reels on the reduced portion, springs between the reels and the shoulders, and collars at the ends of the reduced portions to hold the reels in place.

HOWARD E. SHEELEY.